United States Patent
Lin et al.

(10) Patent No.: US 10,266,410 B2
(45) Date of Patent: Apr. 23, 2019

(54) PREPARATION METHOD OF BATTERY COMPOSITE MATERIAL AND PRECURSOR THEREOF

(71) Applicant: Advanced Lithium Electrochemistry Co., Ltd., Taoyuan (TW)

(72) Inventors: Hsiang-Pin Lin, Taoyuan (TW); Han-Wei Hsieh, Taoyuan (TW); An-Feng Huang, Taoyuan (TW); Chun-Ming Huang, Taoyuan (TW)

(73) Assignee: ADVANCED LITHIUM ELECTROCHEMISTRY CO., LTD., Taoyuan (TW)

( * ) Notice: Subject to any disclaimer, the term of this patent is extended or adjusted under 35 U.S.C. 154(b) by 0 days.

(21) Appl. No.: 15/540,309

(22) PCT Filed: Jan. 7, 2016

(86) PCT No.: PCT/CN2016/070382
§ 371 (c)(1),
(2) Date: Jun. 28, 2017

(87) PCT Pub. No.: WO2016/110261
PCT Pub. Date: Jul. 14, 2016

(65) Prior Publication Data
US 2017/0369317 A1  Dec. 28, 2017

Related U.S. Application Data

(60) Provisional application No. 62/101,054, filed on Jan. 8, 2015.

(51) Int. Cl.
*H01M 4/04* (2006.01)
*H01M 4/52* (2010.01)
(Continued)

(52) U.S. Cl.
CPC .......... *C01B 25/375* (2013.01); *C01B 25/377* (2013.01); *C01B 25/45* (2013.01);
(Continued)

(58) Field of Classification Search
CPC ................................................ H01M 10/0525
(Continued)

(56) References Cited

U.S. PATENT DOCUMENTS

2015/0311505 A1* 10/2015 Khot ................... H01M 4/5825
429/221

FOREIGN PATENT DOCUMENTS

| CA | 2 883 582 A1 | 3/2014 |
| CN | 1720197 | 1/2006 |

(Continued)

OTHER PUBLICATIONS

Synthesis of hureaulite by a reflux process at ambient temperature and pressure, H. Yin et al./Microporous and Mesoporous Materials 153 (2012) 115-123.

*Primary Examiner* — Khanh T Nguyen
(74) *Attorney, Agent, or Firm* — Kirton McConkie; Evan R. Witt

(57) ABSTRACT

A preparation method of battery composite material includes steps of providing a manganese-contained compound, phosphoric acid, a lithium-contained compound, a carbon source, and deionized water; processing a reaction of the manganese-contained compound, the phosphoric acid, and a portion of the deionized water to produce a first product; placing the first product at a first temperature for at least a first time period to produce a first precursor, wherein the chemical formula of the first precursor is written by $Mn_5(HPO_4)_2(PO_4)_2(H_2O)_4$; and processing a reaction of at least the first precursor, the lithium-contained compound, and another portion of the deionized water, adding the carbon source, (Continued)

```
Providing a manganese-contained compound,
phosphoric acid, a lithium-contained compound, a    — S100
carbon source, and deionized water
                    ↓
Processing a reaction of the manganese-contained
compound, the phosphoric acid, and a portion of the  — S200
deionized water to produce a first product
                    ↓
Placing the first product at a first temperature for at
least a first time period to produce a first precursor  — S300
                    ↓
Processing a reaction of at least the first
precursor, the lithium-contained compound, and
another portion of the deionized water, adding the   — S400
carbon source, and then calcining to produce the
battery composite material
``` and then calcining to produce battery composite material. Therefore, the preparation time is shortened, the energy consuming is reduced, the phase forming of the precursor is more stable, and the advantages of reducing the cost of preparation and enhancing the quality of products are achieved.

13 Claims, 22 Drawing Sheets

(51) Int. Cl.
*C01B 25/37* (2006.01)
*C01B 25/45* (2006.01)
*H01M 4/58* (2010.01)
*H01M 4/88* (2006.01)
*H01M 10/052* (2010.01)

(52) U.S. Cl.
CPC ............... *H01M 4/04* (2013.01); *H01M 4/52* (2013.01); *H01M 4/5825* (2013.01); *H01M 4/88* (2013.01); *H01M 10/052* (2013.01); *C01P 2006/40* (2013.01)

(58) Field of Classification Search
USPC .......................................................... 429/221
See application file for complete search history.

(56) References Cited

FOREIGN PATENT DOCUMENTS

| CN | 101891177 | * | 11/2010 | ............. C01B 25/37 |
|---|---|---|---|---|
| CN | 103000898 | | 3/2013 | |
| CN | 103413943 | | 11/2013 | |
| CN | 103985868 | * | 8/2014 | ........ H01M 10/0525 |
| FR | 2848205 A1 | | 6/2004 | |
| JP | 4773964 B2 | | 9/2011 | |
| TW | 201427158 | | 7/2014 | |
| WO | 2014032588 | | 3/2014 | |
| WO | 2014098937 A1 | | 6/2014 | |
| WO | 2014180333 A1 | | 11/2014 | |
| WO | 2014180334 | | 11/2014 | |

* cited by examiner

PREPARATION METHOD OF BATTERY COMPOSITE MATERIAL AND PRECURSOR THEREOF

CROSS-REFERENCE TO RELATED APPLICATION

This application claims the benefit of PCT application No. PCT/CN2016/070382 filed Jan. 7, 2016 which claims priority to U.S. Provisional Application No. 62/101,054 filed Jan. 8, 2015, and entitled "Method for Preparing Metal (II) Phosphate Used as Precursors of $LiMnPO_4$ and $LiMn_xFe_{1-x}PO_4$", the entire contents of which are incorporated herein by reference for all purposes.

FIELD OF THE INVENTION

The present invention relates to a preparation method, and more particularly to a preparation method of battery composite material and a precursor thereof.

BACKGROUND OF THE INVENTION

With the rapid development of global economy, the exhaustion of resources increases day by days. Recently, the concept of environmental protection becomes much more important. In order to overcome the problems of energy shortages and also focus on the sustainable management at the same time, looking for eco-friendly, clean and effective alternative energies has become an important development direction in the industry. Among varieties of alternative energies, the research and development of chemical battery is actively invested by related industries, such that the technology of battery preparation is improved, and the battery efficiency is enhanced. Furthermore, the chemical batteries are also widely used in our daily life, such as consuming electronics, medical equipment, electric bicycles, electric motorcycles, electric cars and electric buses.

In kinds of chemical batteries, lithium batteries are widely accepted in the market and become popular because of its characteristics of high energy density, no memory effect, long cycle life and non-pollution. In addition, the batteries applying lithium manganese phosphate ($LiMnPO_4$) as the cathode material have higher energy density, higher charging and discharging capacity, stability and safety, and advantages of rich source of raw materials and lower price, so the lithium manganese phosphate has become a cathode material of lithium batteries with high potential in development.

However, in the conventional preparation methods of lithium manganese phosphate, hydrothermal method and organic solution method are usually adopted, in which steps are more complicated. Furthermore, the preparation temperatures and the energy consumption are high in those methods, and the phase of manganese lithium phosphate is also unstable. In addition, the manganese lithium phosphate is often deemed as reactants of transition state.

Therefore, there is a need of providing a preparation method of a battery composite material and a precursor thereof to solve the drawbacks in prior arts, simplify the steps of the preparation, reduce the energy consumption, and achieve the advantages of making the phase of manganese lithium phosphate stable.

SUMMARY OF THE INVENTION

It is an object of the present invention to provide a preparation method of a battery composite material and a precursor thereof in order to solve the drawbacks of prior art.

The present invention provides a preparation method of a battery composite material and a precursor thereof. Through simple aqueous solution method, the precursor is produced by reacting in acidic environment to prepare the battery composite material. The steps of the preparation method are less complicated, such that the preparation time is reduced, and the preparation effectiveness is enhanced.

The present invention also provides a preparation method of a battery composite material and a precursor thereof. By producing the precursor at low temperature within a short time period in the process of a low-temperature phase method, the energy consumption is reduced, the phase of the precursor is more stable, and the advantages of reducing the cost of preparation and enhancing the quality of products are achieved.

In accordance with an aspect of the present invention, there is provided a preparation method of a battery composite material. The preparation method of a battery composite material at least comprises steps of: (a) providing a manganese-contained compound, phosphoric acid, a lithium-contained compound, a carbon source, and deionized water, wherein the chemical formula of the phosphoric acid is written by $H_3PO_4$; (b) processing a reaction of the manganese-contained compound, the phosphoric acid, and a portion of the deionized water to produce a first product; (c) placing the first product at a first temperature for at least a first time period to produce a first precursor, wherein the chemical formula of the first precursor is written by $Mn_5(HPO_4)_2(PO_4)_2(H_2O)_4$; and (d) processing a reaction of at least the first precursor, the lithium-contained compound, and another portion of the deionized water, adding the carbon source, and then calcining to produce the battery composite material.

In accordance with an aspect of the present invention, there is provided a preparation method of a precursor of a battery composite material. The preparation method of a precursor of a battery composite material at least comprises steps of: (a) providing a manganese-contained compound, phosphoric acid, and deionized water, wherein the chemical formula of the phosphoric acid is written by $H_3PO_4$; (b) processing a reaction of the manganese-contained compound, the phosphoric acid, and the deionized water to produce a first product; and (c) placing the first product at a first temperature for at least a first time period to produce a first precursor, wherein the chemical formula of the first precursor is written by $Mn_5(HPO_4)_2(PO_4)_2(H_2O)_4$.

In accordance with an aspect of the present invention, there is provided a preparation method of a battery composite material. The preparation method of a battery composite material at least comprises steps of processing a reaction of a precursor, a lithium-contained compound, and deionized water, adding a carbon source, and then calcining to produce the battery composite material, wherein the chemical formula of the precursor is written by $Mn_5(HPO_4)_2(PO_4)_2(H_2O)_4$, and the chemical formula of the battery composite material is written by $LiMnPO_4$.

In accordance with an aspect of the present invention, there is provided a preparation method of a battery composite material. The preparation method of a battery composite material at least comprises steps of: (a) providing a manganese-contained compound, an iron-contained compound, phosphoric acid, a lithium-contained compound, a carbon source, and deionized water, wherein the chemical formula of the phosphoric acid is written by $H_3PO_4$; (b) processing a reaction of the manganese-contained compound, the iron-contained compound, the phosphoric acid, and a portion of the deionized water to produce a second product; (c) placing the second product at a first temperature for at least a first time period to produce a second precursor, wherein the chemical formula of the second precursor is written by $(Mn_x Fe_{1-x})_5(HPO_4)_2(PO_4)_2(H_2O)_4$, and wherein x is larger than 0.5 and less than or equal to 1; and (d) processing a reaction of at least the second precursor, the lithium-contained compound, and another portion of the deionized water, adding the carbon source, and then calcining to produce the battery composite material, wherein the chemical formula of the battery composite material is written by $LiMn_x Fe_{1-x}PO_4$.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
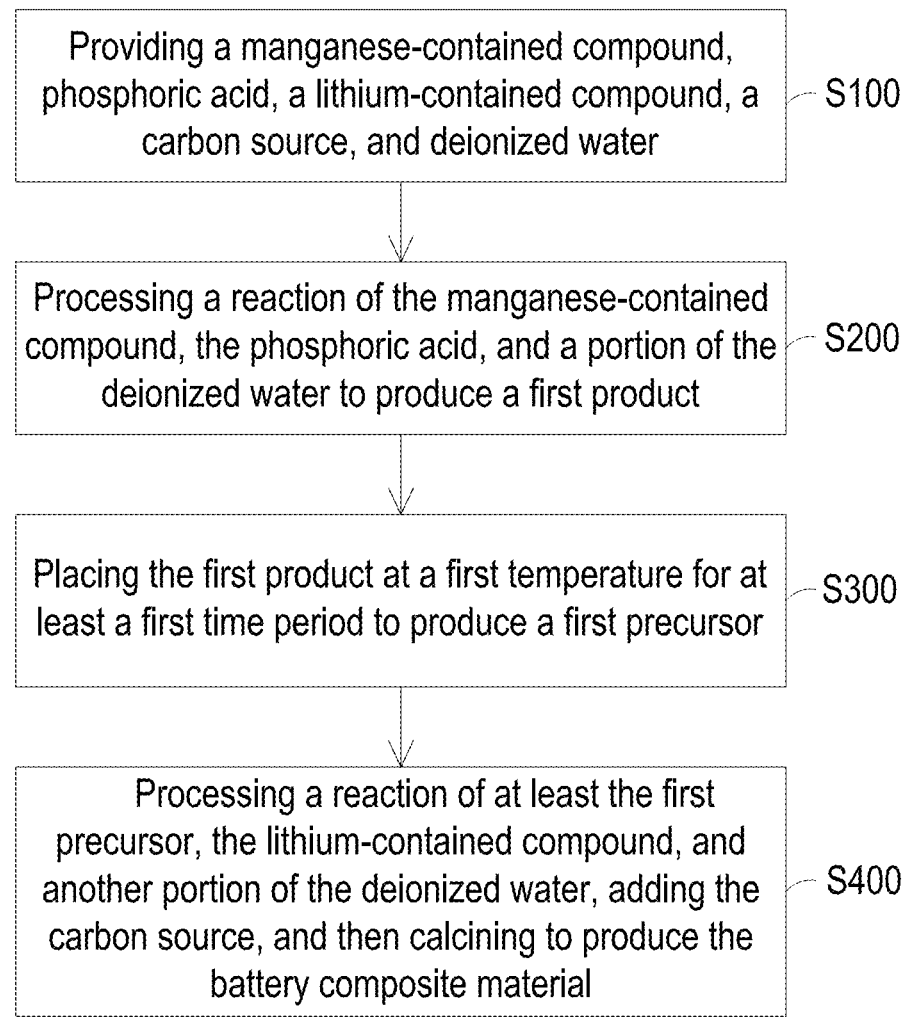
FIG. 1 schematically illustrates the flow chart of a preparation method of a battery composite material according to an embodiment of the present invention.

Please refer to FIG. 1, which schematically illustrates the flow chart of a preparation method of a battery composite material according to an embodiment of the present invention. As shown in FIG. 1, the preparation method of a battery composite material of the present invention comprises steps as follows. Firstly, in a step S100, a manganese-contained compound, phosphoric acid, a lithium-contained compound, a carbon source, and deionized water are provided, among which the chemical formula of the phosphoric acid is written by $H_3PO_4$. In some embodiments, the manganese-contained compound is manganese carbonate ($MnCO_3$), manganese nitrate ($Mn(NO_3)_2$), manganese sulfate ($MnSO_4$) or other compound containing manganese-ion. The lithium-contained compound is lithium carbonate ($Li_2CO_3$), lithium hydroxide (LiOH), lithium acetate ($LiCH_3COO$) or other compound containing lithium-ion, but not limited herein. Furthermore, the carbon source is a carbohydrate, an organic compound, a polymer or a macromolecule material, but not limited thereto.

Next, in a step S200, a reaction of the manganese-contained compound, the phosphoric acid, and a portion of the deionized water is processed to produce a first product.

The step S200 further comprises a step of performing a grinding and dispersing action and a drying action to the first product. The grinding action can be implemented by a ball mill, and the drying action can be implemented by rolling dehydration or spray drying, but not limited herein. In addition, the drying method of rolling dehydration can perform drying action to the first product abundantly and rapidly, so that the productivity of the dried first product produced by rolling dehydration is high.

Then, in a step S300, the first product is placed at a first temperature for at least a first time period to produce a first precursor, and the chemical formula of the first precursor is written by $Mn_5(HPO_4)_2(PO_4)_2(H_2O)_4$. In some embodiments, the first temperature is larger than or equal to 60° C., and less than or equal to 100° C., which means 60° C.≤the first temperature≤100° C. The first time period is larger than or equal to 18 hours, that is to say, the first time period ≥18 hours.

Lastly, in a step S400, a reaction of at least the first precursor, the lithium-contained compound, and another portion of the deionized water is processed, then the carbon source is added and then calcined to produce the battery composite material such as lithium manganese phosphate ($LiMnPO_4$).

In some embodiments, in the step S400, a reaction of the first precursor, an iron-contained compound, the lithium-contained compound, and another portion of the deionized water can be processed, and the iron-contained compound is heptairon hexaphosphate ($Fe_7(PO_4)_6$), iron(III) phosphate dihydrate ($FePO_4.2H_2O$) or other compound containing iron-ion. Then, the carbon source is added and then calcined to produce the battery composite material such as lithium iron manganese phosphate, which is written by $LiMn_xFe_{1-x}PO_4$, and x is larger than 0.5 and less than or equal to 1.

That is to say, in the preparation method of battery composite material and a precursor thereof of the present invention, through simple aqueous solution method, the precursor is produced by reacting in acidic environment to prepare the battery composite material. The steps of the preparation method are less complicated, such that the preparation time is reduced, and the preparation effectiveness is enhanced. Meanwhile, by producing the precursor at low temperature within a short time period in the process of a low-temperature phase method, the energy consumption is reduced, the phase of the precursor is more stable, and the advantages of reducing the cost of preparation and enhancing the quality of products are achieved.

Figure 2:
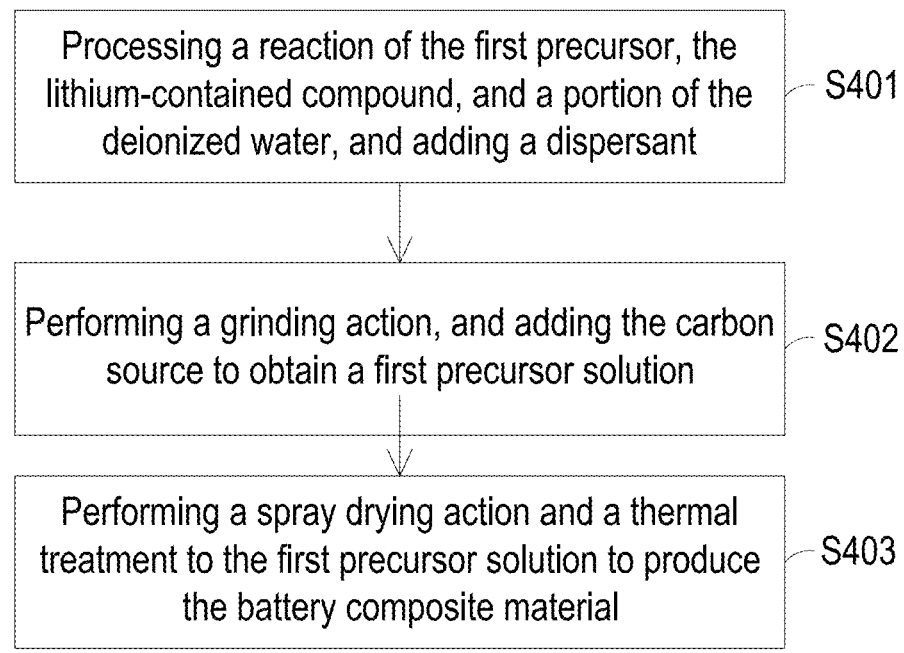
FIG. 2 schematically illustrates a detailed flow chart of the preparation method of a battery composite material according to an embodiment of the present invention.

Please refer to FIG. 1 and FIG. 2. FIG. 2 schematically illustrates a detailed flow chart of the preparation method of a battery composite material according to an embodiment of the present invention. As shown in FIG. 1 and FIG. 2, the detail of the step S400 of the preparation method of a battery composite material comprises steps as follows. In a step S401, a reaction of the first precursor, the lithium-contained compound and a portion of the deionized water is processed, and a dispersant is added. The dispersant can be a nonionic surfactant such as Triton X-100. Next, in a step S402, a grinding action is performed, and the carbon source is added to obtain a first precursor solution. The grinding action can be implemented by a ball mill, but not limited thereto. Then, in a step S403, a spray drying action and a thermal treatment is performed to the first precursor solution to produce the battery composite material such as lithium manganese phosphate ($LiMnPO_4$).

In the step S403, the spray drying action can be performed by a rotary disk spray dryer, but not limited herein. In addition, the thermal treatment is performed to the spray-dried product at a temperature larger than 600° C. for at least 5 hours, such as sintering to phase at 600° C. for 5 hours, but not limited thereto.

Figure 3:
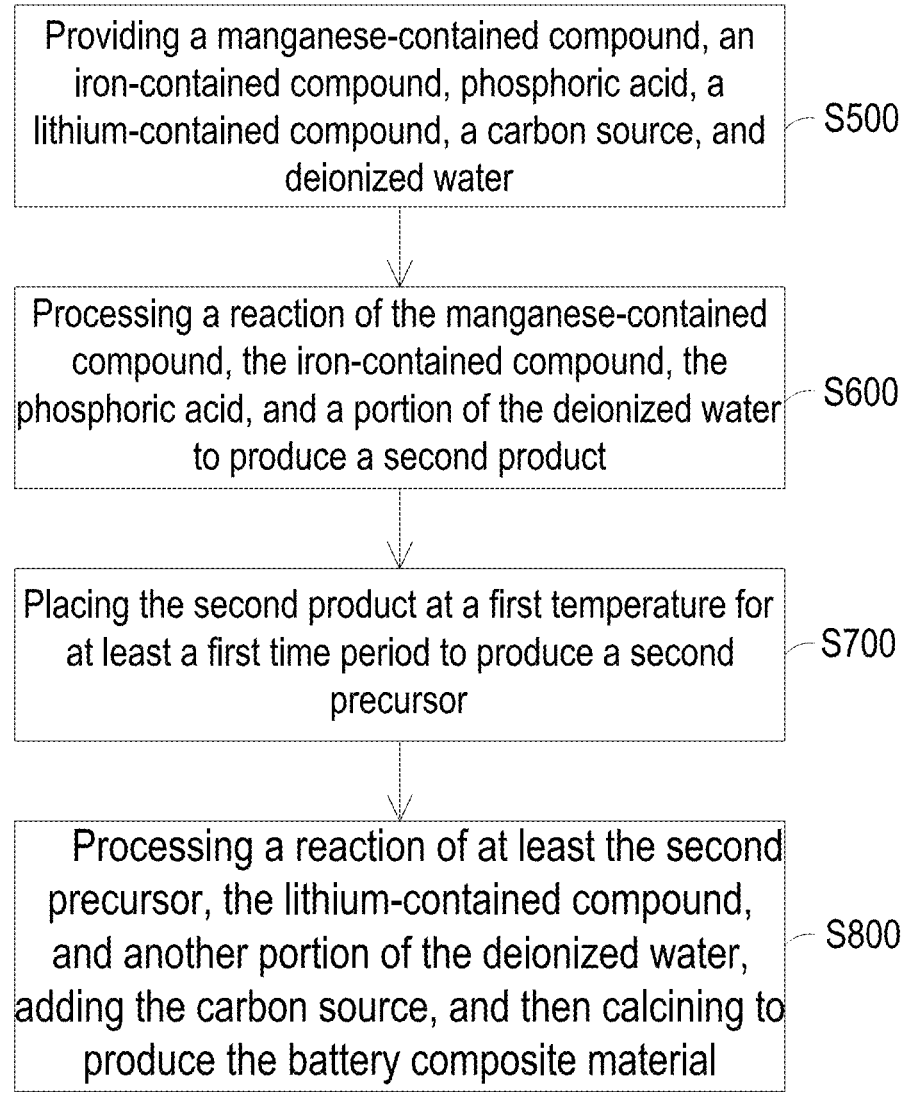
FIG. 3 schematically illustrates the flow chart of a preparation method of a battery composite material according to another embodiment of the present invention.

Please refer to FIG. 3, which schematically illustrates the flow chart of a preparation method of a battery composite material according to another embodiment of the present invention. As shown in FIG. 3, the preparation method of a battery composite material of the present invention comprises steps as follows. Firstly, in a step S500, a manganese-contained compound, an iron-contained compound, phosphoric acid, a lithium-contained compound, a carbon source, and deionized water are provided, among which the chemical formula of the phosphoric acid is written by $H_3PO_4$. In some embodiments, the manganese-contained compound is manganese carbonate ($MnCO_3$), manganese nitrate ($Mn(NO_3)_2$), manganese sulfate ($MnSO_4$) or other compound containing manganese-ion. The iron-contained compound is iron(II) acetate ($Fe(CH_3COOH)_2$), iron(II) oxalate dihydrate ($FeC_7O_4 \cdot 2H_2O$) or other compound containing iron-ion. The lithium-contained compound is lithium carbonate ($Li_7CO_3$), lithium hydroxide (LiOH), lithium acetate ($LiCH_3COO$) or other compound containing lithium-ion, but not limited herein. Furthermore, the carbon source is a carbohydrate, an organic compound, a polymer or a macromolecule material, but not limited thereto.

Next, in a step S600, a reaction of the manganese-contained compound, the iron-contained compound, the phosphoric acid, and a portion of the deionized water is processed to produce a second product. The step S600 further comprises a step of performing a grinding and dispersing action and a drying action to the second product.

Then, in a step S700, the second product is placed at a first temperature for at least a first time period to produce a second precursor. The chemical formula of the second precursor is written by $(Mn_x,Fe_{1-x})_5(HPO_4)_2(PO_4)_2(H_2O)_4$, and 0.5x<x≤1. Furthermore, the first temperature≤100° C., and the first time period≥18 hours.

Lastly, in a step S800, a reaction of at least the second precursor, the lithium-contained compound, and another portion of the deionized water is processed, then the carbon source is added so as to be calcined for producing the battery composite material. The chemical formula of the battery composite material is written by $LiMn_xFe_{1-x}PO_4$.

The following embodiments are presented herein for purpose of illustration and description of the preparation method of the battery composite material and the precursor thereof of the present disclosure.

Embodiment 1

Figure 4A:
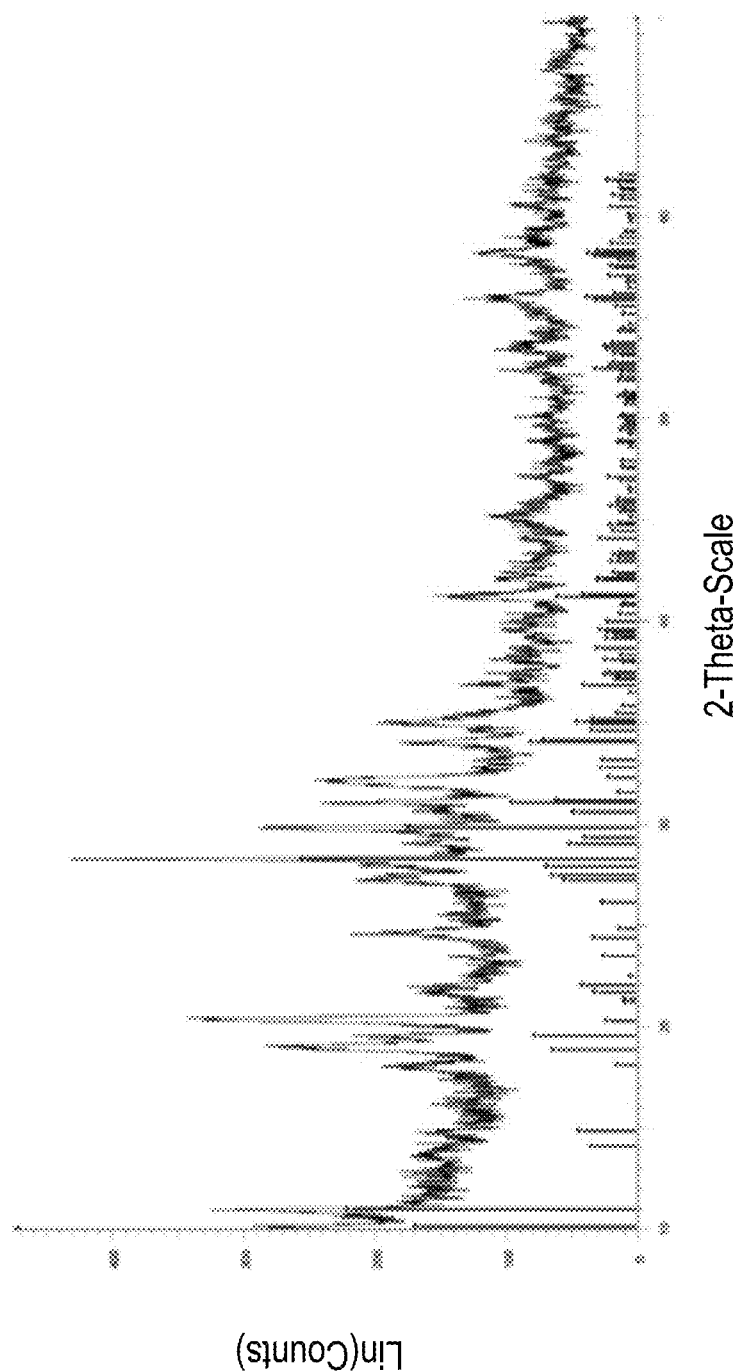
FIG. 4A schematically illustrates the X-ray diffraction analysis diagram of a precursor prepared by the preparation method according to an embodiment of the present invention.
Figure 4B:
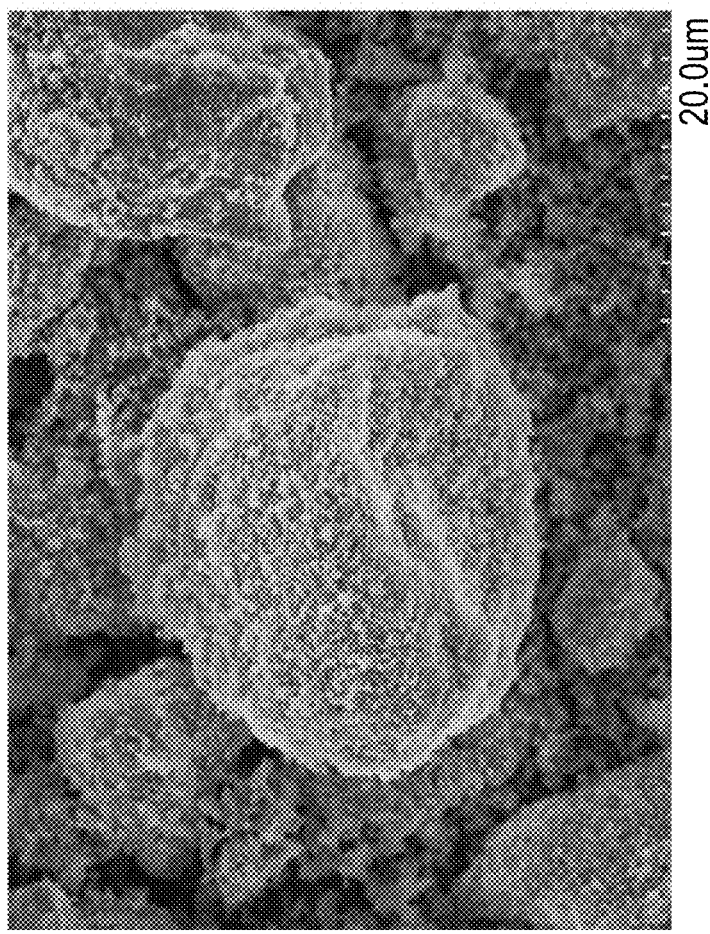
FIG. 4B schematically illustrates the SEM analysis diagram of a precursor prepared by the preparation method according to an embodiment of the present invention.

Firstly, 574.7 grams of manganese carbonate ($MnCO_3$), 575.61 grams of phosphoric acid ($H_3PO_4$) with weight percentage concentration equal to 85.1%, and 2 liters of deionized water are provided to process a reaction in order to produce a first product. Next, the first product is grinded and dispersed by the ball mill, and then placed at the temperature of 60° C. to 100° C. to dry for at least 18 hours to produce the precursor by the process of a low-temperature phase method. The precursor is analyzed in manner of X-ray diffraction, and the analysis diagram is shown as FIG. 4A. After comparing the diagram with JCPDS card, the compound is confirmed to be $Mn_5(HPO_4)_2(PO_4)_2(H_2O)_4$. The surface exterior is analyzed through SEM, and the SEM analysis diagram is shown as FIG. 4B.

Embodiment 2

Firstly, 574.7 grams of manganese carbonate ($MnCO_3$), 575.61 grams of phosphoric acid ($H_3PO_4$) with weight percentage concentration equal to 85.1%, and 2 liters of deionized water are provided to process a reaction in order to produce a first product. Next, the first product is grinded and dispersed by the ball mill, then dried through the rolling dehydration, and placed at the temperature of 60° C. to 100° C. for at least 18 hours to produce the precursor by the process of a low-temperature phase method. The precursor is analyzed in manner of X-ray diffraction, and the analysis diagram is shown as FIG. 4A. After comparing the diagram with JCPDS card, the compound is confirmed to be $Mn_5(HPO_4)_2(PO_4)_2(H_2O)_4$. The surface exterior is analyzed through SEM, and the SEM analysis diagram is shown as FIG. 4B.

Embodiment 3

Firstly, 574.7 grams of manganese carbonate ($MnCO_3$), 575.61 grams of phosphoric acid ($H_3PO_4$) with weight percentage concentration equal to 85.1%, and 2 liters of deionized water are provided to process a reaction in order to produce a first product. Next, the first product is grinded and dispersed by the ball mill, then dried through the spray drying method, and placed at the temperature of 60° C. to 100° C. for at least 18 hours to produce the precursor by the process of a low-temperature phase method. The precursor is analyzed in manner of X-ray diffraction, and the analysis diagram is shown as FIG. 4A. After comparing the diagram with JCPDS card, the compound is confirmed to be $Mn_5(HPO_4)_2(PO_4)_2(H_2O)_4$. The surface exterior is analyzed through SEM, and the SEM analysis diagram is shown as FIG. 4B.

Embodiment 4

Figure 5A:
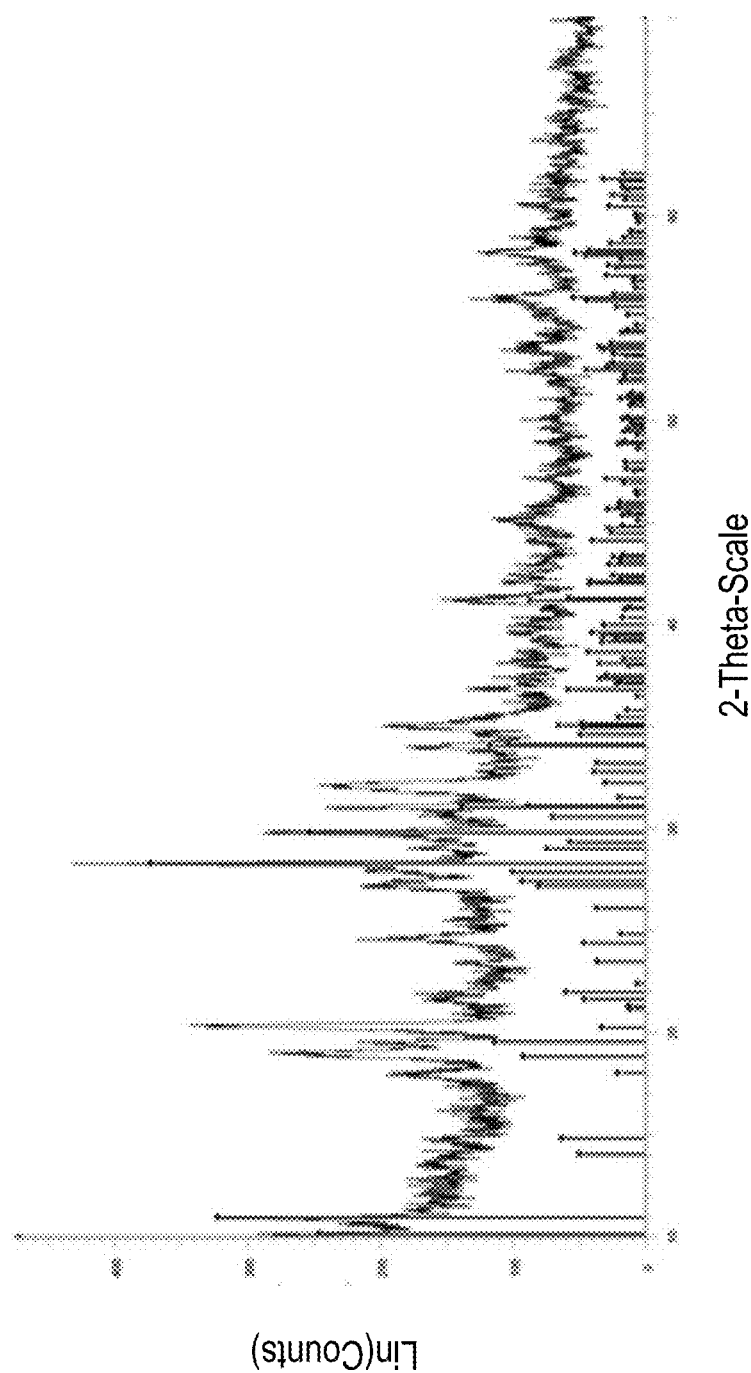
FIG. 5A schematically illustrates the X-ray diffraction analysis diagram of a precursor prepared by the preparation method according to another embodiment of the present invention.
Figure 5B:
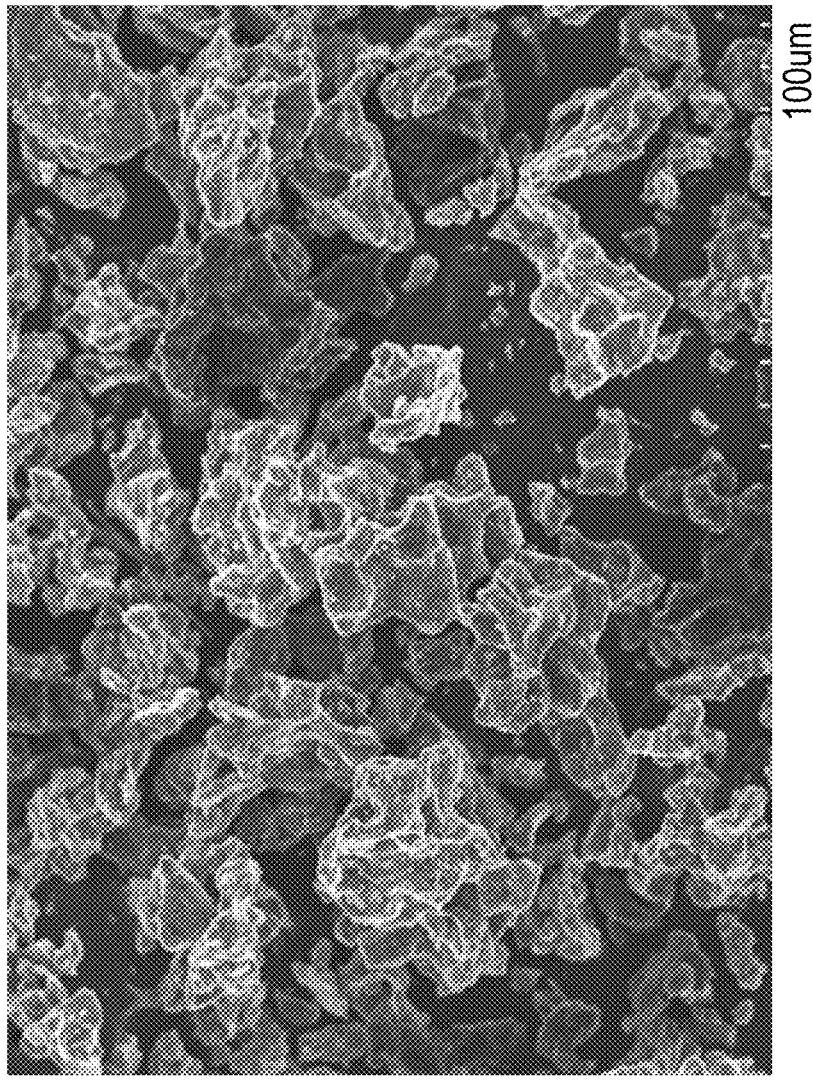
FIG. 5B schematically illustrates the SEM analysis diagram of a precursor prepared by the preparation method according to another embodiment of the present invention.

Firstly, 894.9 grams of manganese nitrate ($Mn(NO_3)_2$), 575.61 grams of phosphoric acid ($H_3PO_4$) with weight percentage concentration equal to 85.1%, and 2 liters of deionized water are provided to process a reaction. Then, the PH value is adjusted to 7-8 by ammonia solution ($NH_4OH$), and the solution is precipitated to produce a first product. Next, the first product is grinded and dispersed by the ball mill, and then placed at the temperature of 60° C. to 100° C. to dry for at least 18 hours to produce the precursor by the process of a low-temperature phase method. The precursor is analyzed in manner of X-ray diffraction, and the analysis diagram is shown as FIG. 5A. After comparing the diagram with JCPDS card, the compound is confirmed to be $Mn_5(HPO_4)_2(PO_4)_2(H_2O)_4$. The surface exterior is analyzed through SEM, and the SEM analysis diagram is shown as FIG. 5B.

Embodiment 5

Figure 6A:
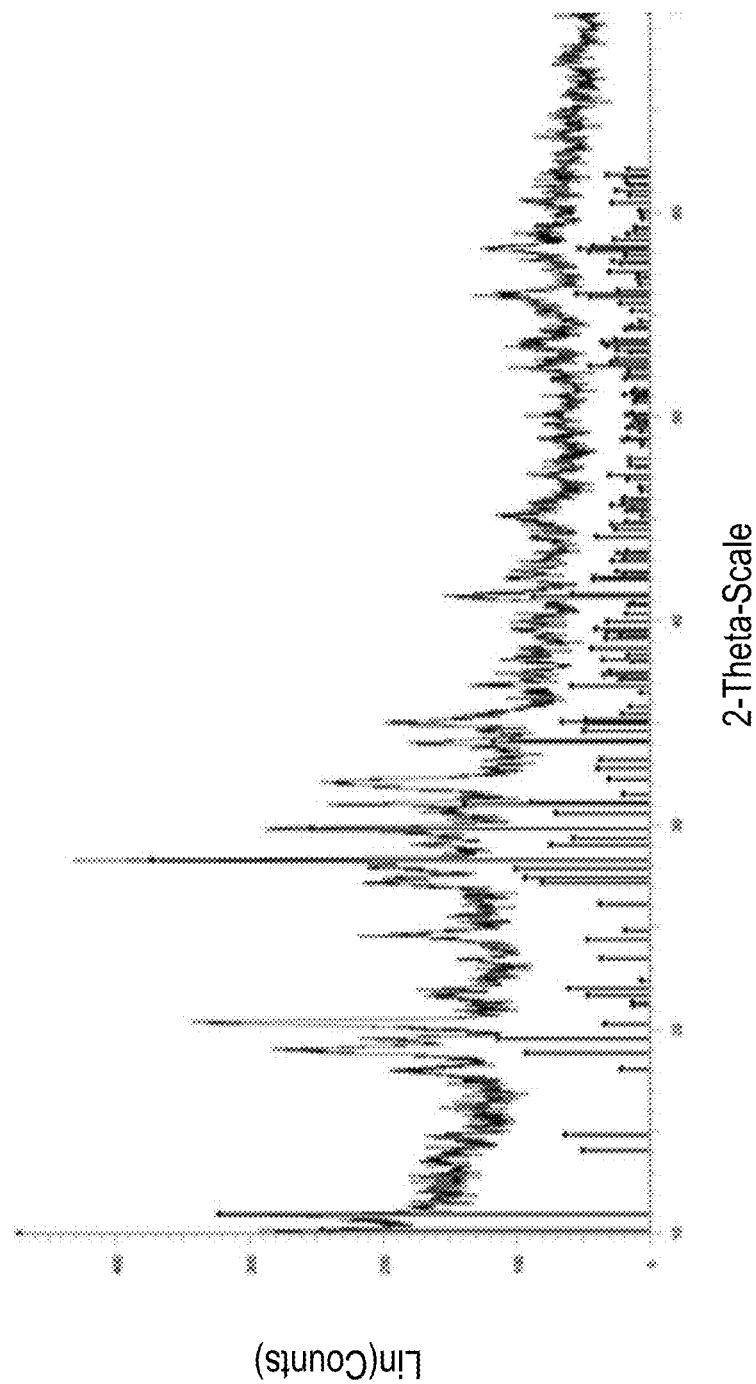
FIG. 6A schematically illustrates the X-ray diffraction analysis diagram of a precursor prepared by the preparation method according to another embodiment of the present invention.
Figure 6B:
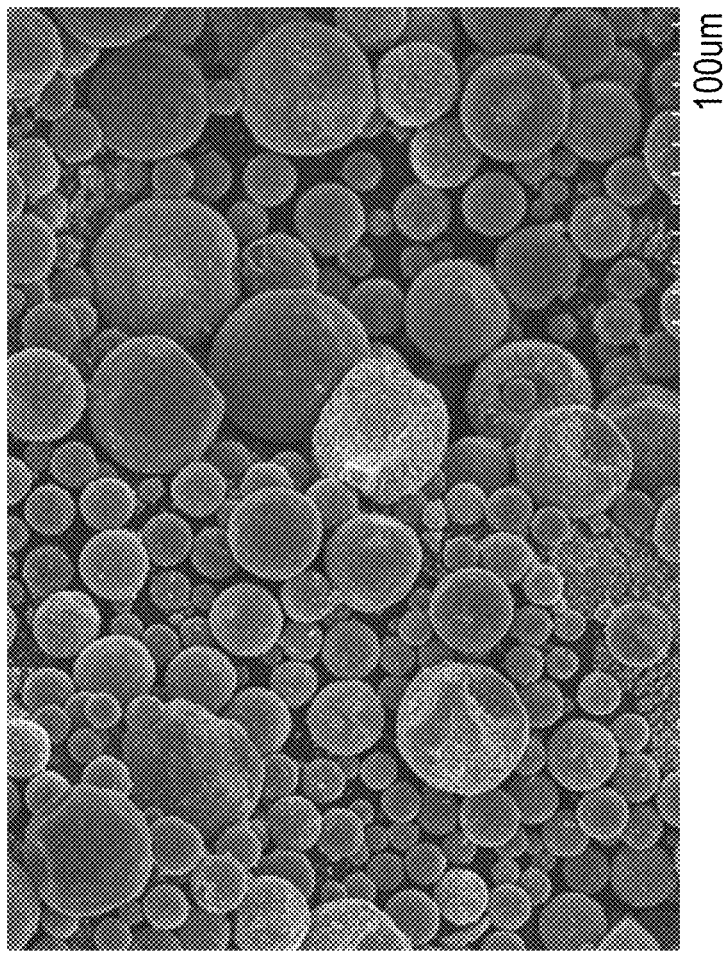
FIG. 6B schematically illustrates the SEM analysis diagram of a precursor prepared by the preparation method according to another embodiment of the present invention.

Firstly, 754.9 grams of manganese sulfate ($MnSO_4$), 575.61 grams of phosphoric acid ($H_3PO_4$) with weight percentage concentration equal to 85.1%, and 2 liters of deionized water are provided to process a reaction. Then, the PH value is adjusted to 7-8 by ammonia solution ($NH_4OH$), and the solution is precipitated to produce a first product. After filtering, the first product is grinded and dispersed by the ball mill, and then placed at the temperature of 60° C. to 100° C. to dry for at least 18 hours to produce the precursor by the process of a low-temperature phase method. The precursor is analyzed in manner of X-ray diffraction, and the analysis diagram is shown as FIG. 6A. After comparing the diagram with JCPDS card, the compound is confirmed to be $Mn_5(HPO_4)_2(PO_4)_2(H_2O)_4$. The surface exterior is analyzed through SEM, and the SEM analysis diagram is shown as FIG. 6B.

Embodiment 6

Figure 7A:
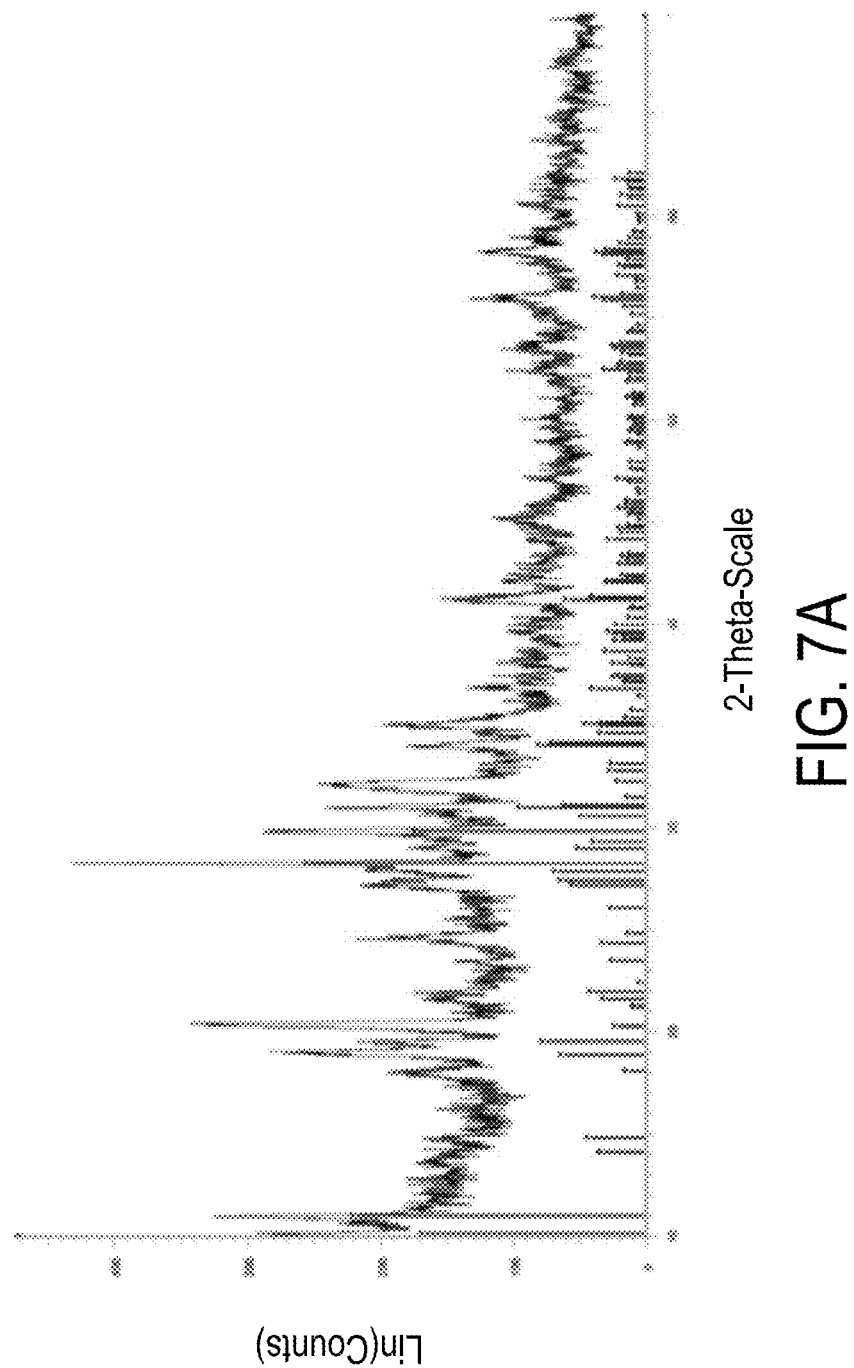
FIG. 7A schematically illustrates the X-ray diffraction analysis diagram of a precursor prepared by the preparation method according to another embodiment of the present invention.
Figure 7B:
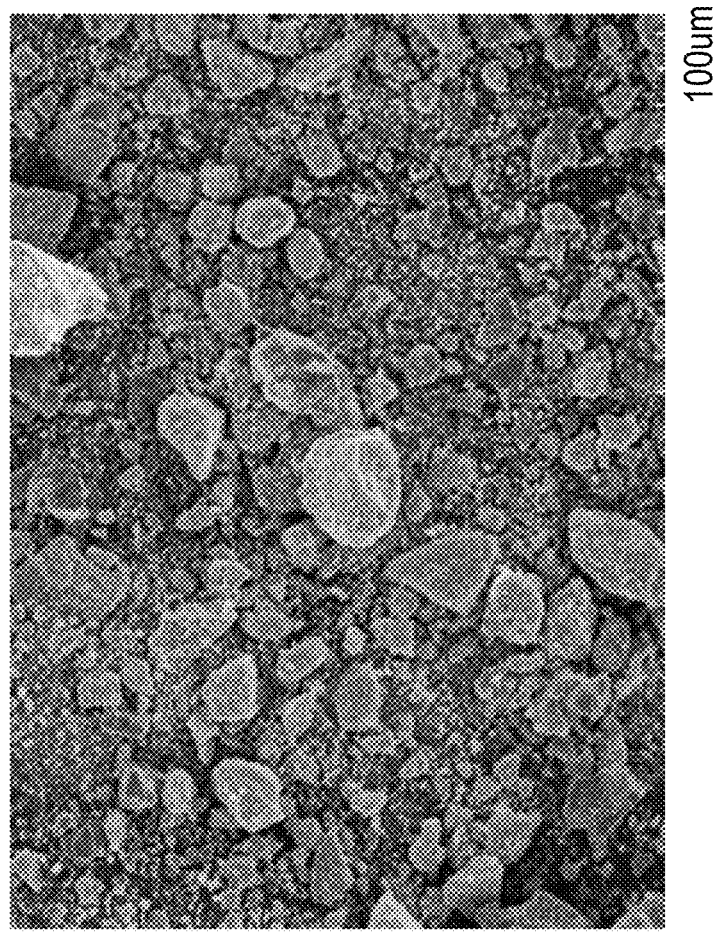
FIG. 7B schematically illustrates the SEM analysis diagram of a precursor prepared by the preparation method according to another embodiment of the present invention.

Firstly, 402.3 grams of manganese carbonate ($MnCO_3$), 260.9 grams of iron(II) acetate ($Fe(CH_3COOH)_2$), 571.61 grams of phosphoric acid ($H_3PO_4$) with weight percentage concentration equal to 85.1%, and 2 liters of deionized water are provided to process a reaction in order to produce a second product. Next, the second product is grinded and dispersed by the ball mill, and then placed at the temperature of 60° C. to 100° C. to dry for at least 18 hours to produce the precursor by the process of a low-temperature phase method. The precursor is analyzed in manner of X-ray diffraction, and the analysis diagram is shown as FIG. 7A. After comparing the diagram with JCPDS card, the compound is confirmed to be $(Mn_{0.7},Fe_{0.3})_5(HPO_4)_2(PO_4)_2(H_2O)_4$. The surface exterior is analyzed through SEM, and the SEM analysis diagram is shown as FIG. 7B.

Embodiment 7

Figure 8A:
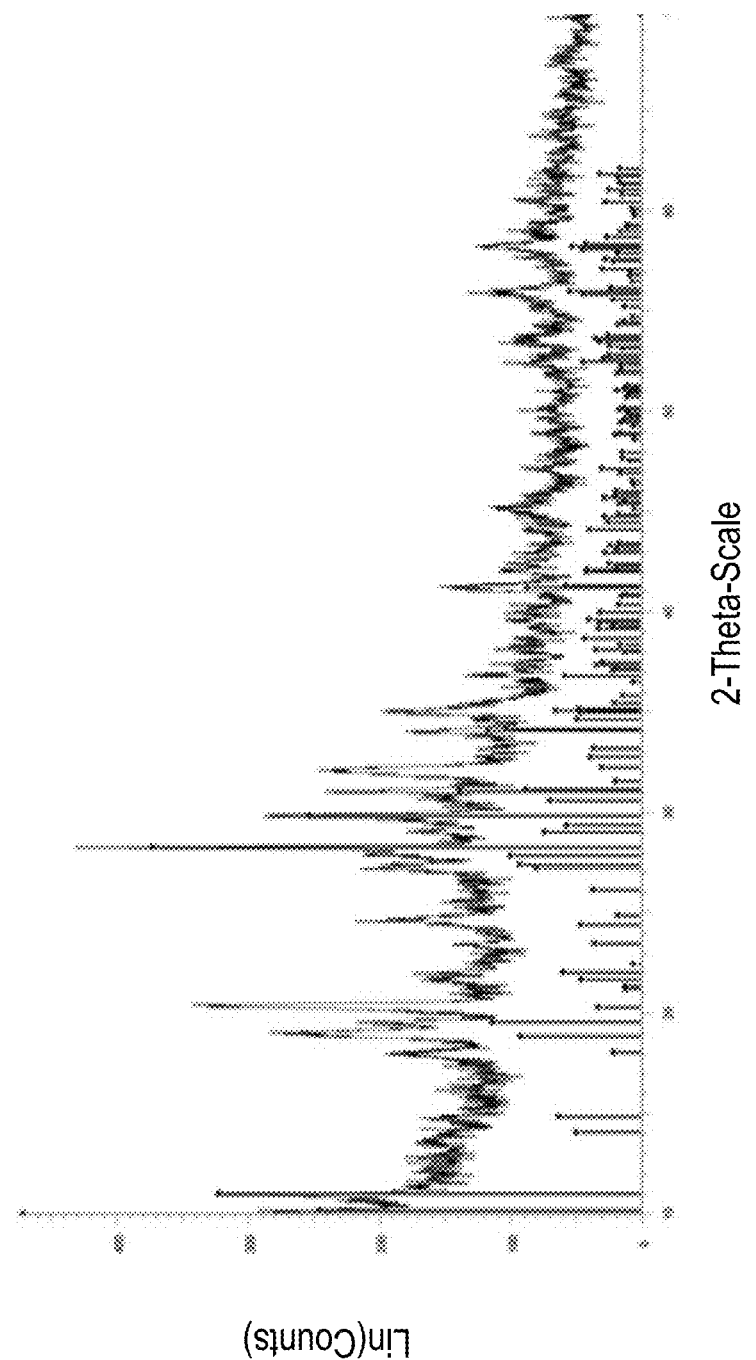
FIG. 8A schematically illustrates the X-ray diffraction analysis diagram of a precursor prepared by the preparation method according to another embodiment of the present invention.
Figure 8B:
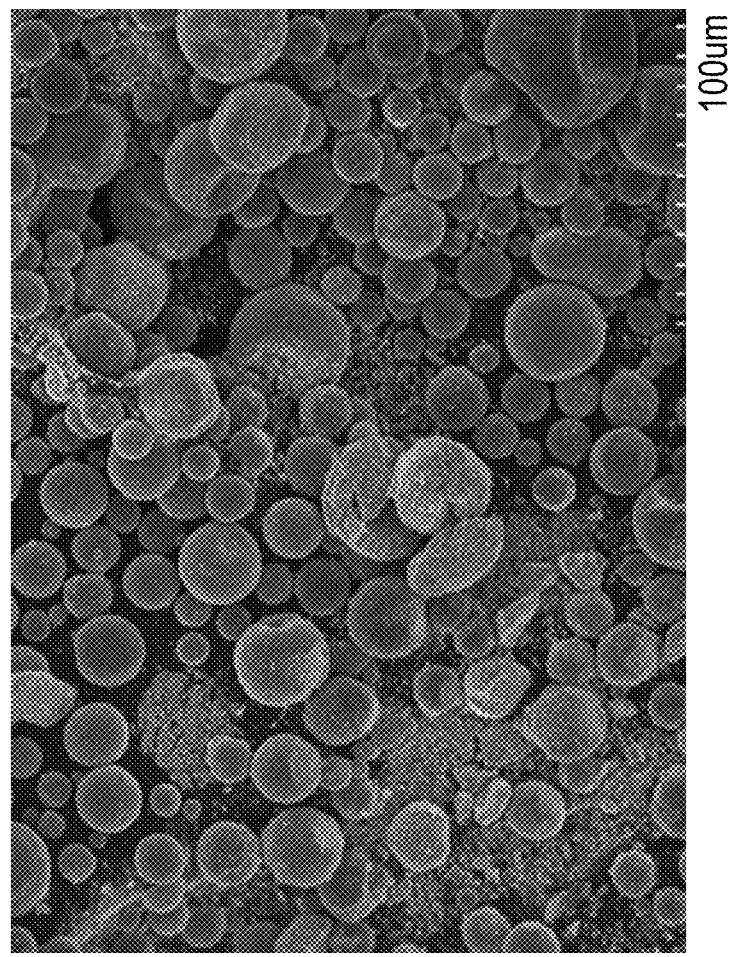
FIG. 8B schematically illustrates the SEM analysis diagram of a precursor prepared by the preparation method according to another embodiment of the present invention.

Firstly, 402.3 grams of manganese carbonate ($MnCO_3$), 269.8 grams of iron(II) oxalate dihydrate ($FeC_2O_4 \cdot 2H_2O$), 571.61 grams of phosphoric acid ($H_3PO_4$) with weight percentage concentration equal to 85.1%, and 2 liters of deionized water are provided to process a reaction in order to produce a second product. Next, the second product is grinded and dispersed by the ball mill, and then placed at the temperature of 60° C. to 100° C. to dry for at least 18 hours to produce the precursor by the process of a low-temperature phase method. The precursor is analyzed in manner of X-ray diffraction, and the analysis diagram is shown as FIG. 8A. After comparing the diagram with JCPDS card, the compound is confirmed to be $(Mn_{0.7},Fe_{0.3})_5(HPO_4)_2(PO_4)_2(H_2O)_4$. The surface exterior is analyzed through SEM, and the SEM analysis diagram is shown as FIG. 8B.

Embodiment 8

Figure 9A:
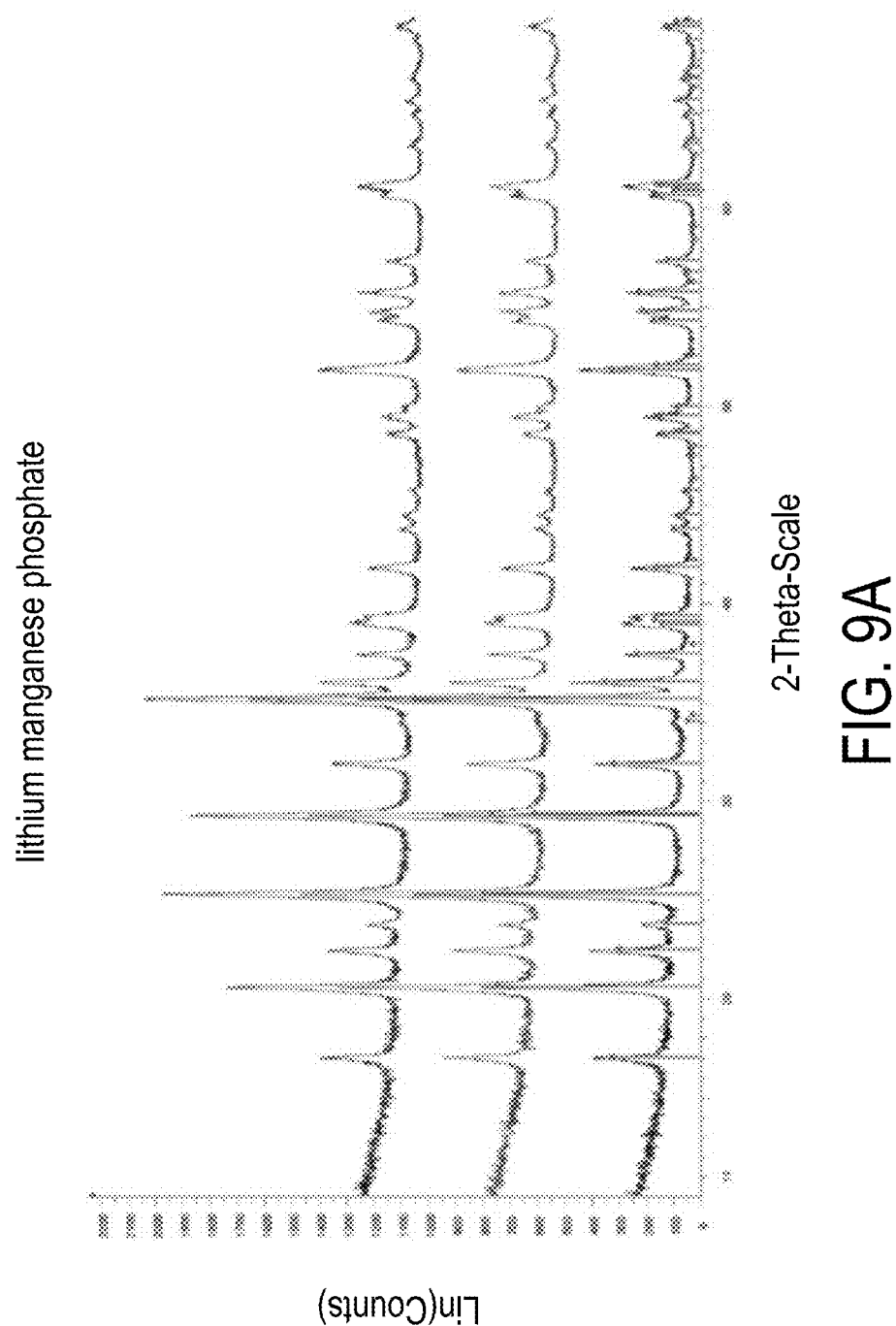
FIG. 9A schematically illustrates the X-ray diffraction analysis diagram of a battery composite material prepared by the preparation method of the battery composite material of the present invention.
Figure 9B:
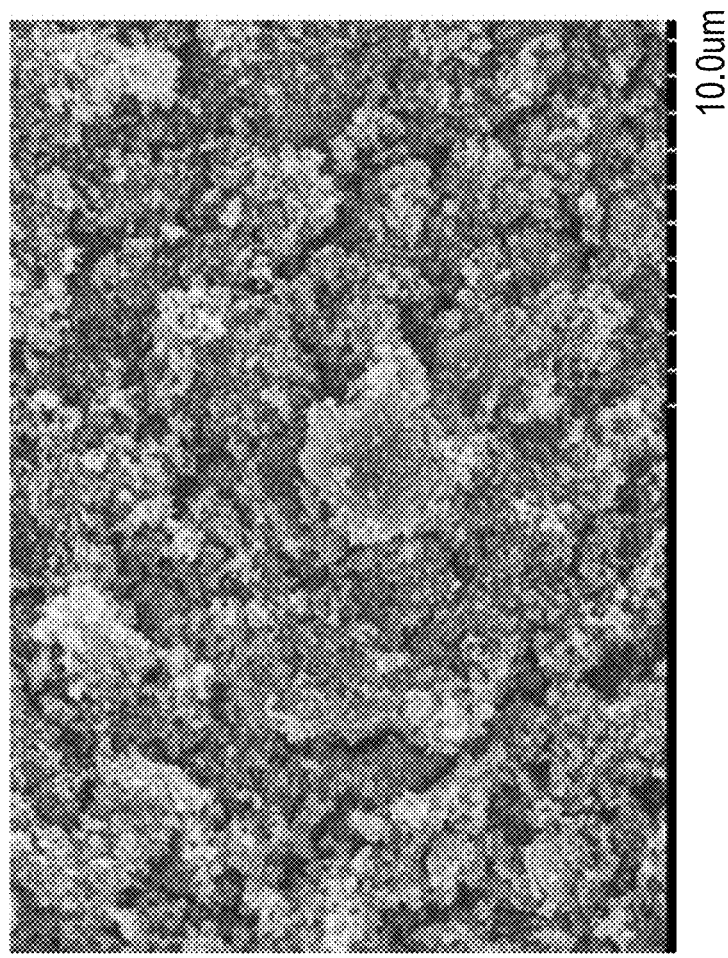
FIG. 9B schematically illustrates the SEM analysis diagram of a battery composite material prepared by the preparation method of the battery composite material of the present invention.

799.88 grams of the precursor, $Mn_5(HPO_4)_2(PO_4)_2(H_2O)_4$, obtained in the above-mentioned embodiments, 184.7 grams of lithium carbonate ($Li_2CO_3$), and 2 liters of deionized water are provided to process a reaction. Next, after dispersing and grinding, carbon source is added to obtain precursor solution. Then, the precursor solution is dried by the spray drying method, and sintered to phase at 600° C. for 5 hours to produce the battery composite material. The battery composite material is analyzed in manner of X-ray diffraction, and the analysis diagram is shown as FIG. 9A. After comparing the diagram with JCPDS card, the compound is confirmed to be lithium manganese phosphate ($LiMnPO_4$). The surface exterior is analyzed through SEM, and the SEM analysis diagram is shown as FIG. 9B.

Embodiment 9

Figure 9C:
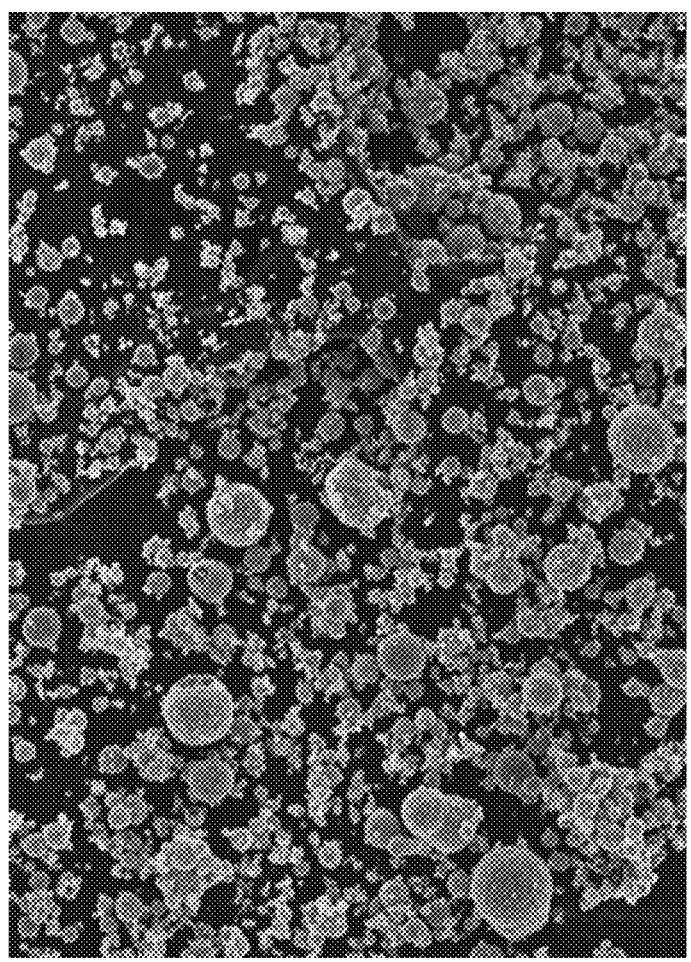
FIG. 9C schematically illustrates the SEM analysis diagram of another battery composite material prepared by the preparation method of the battery composite material of the present invention.

799.88 grams of the precursor, $Mn_5(HPO_4)_2(PO_4)_2(H_2O)_4$, obtained in the above-mentioned embodiments, 209.7 grams of lithium hydroxide (LiOH), and 2 liters of deionized water are provided to process a reaction. Next, after dispersing and grinding, carbon source is added to obtain precursor solution. Then, the precursor solution is dried by the spray drying method, and sintered to phase at 600° C. for 5 hours to produce the battery composite material. The battery composite material is analyzed in manner of X-ray diffraction, and the analysis diagram is shown as FIG. 9A. After comparing the diagram with JCPDS card, the compound is confirmed to be lithium manganese phosphate ($LiMnPO_4$). The surface exterior is analyzed through SEM, and the SEM analysis diagram is shown as FIG. 9C.

Embodiment 10

Figure 10A:
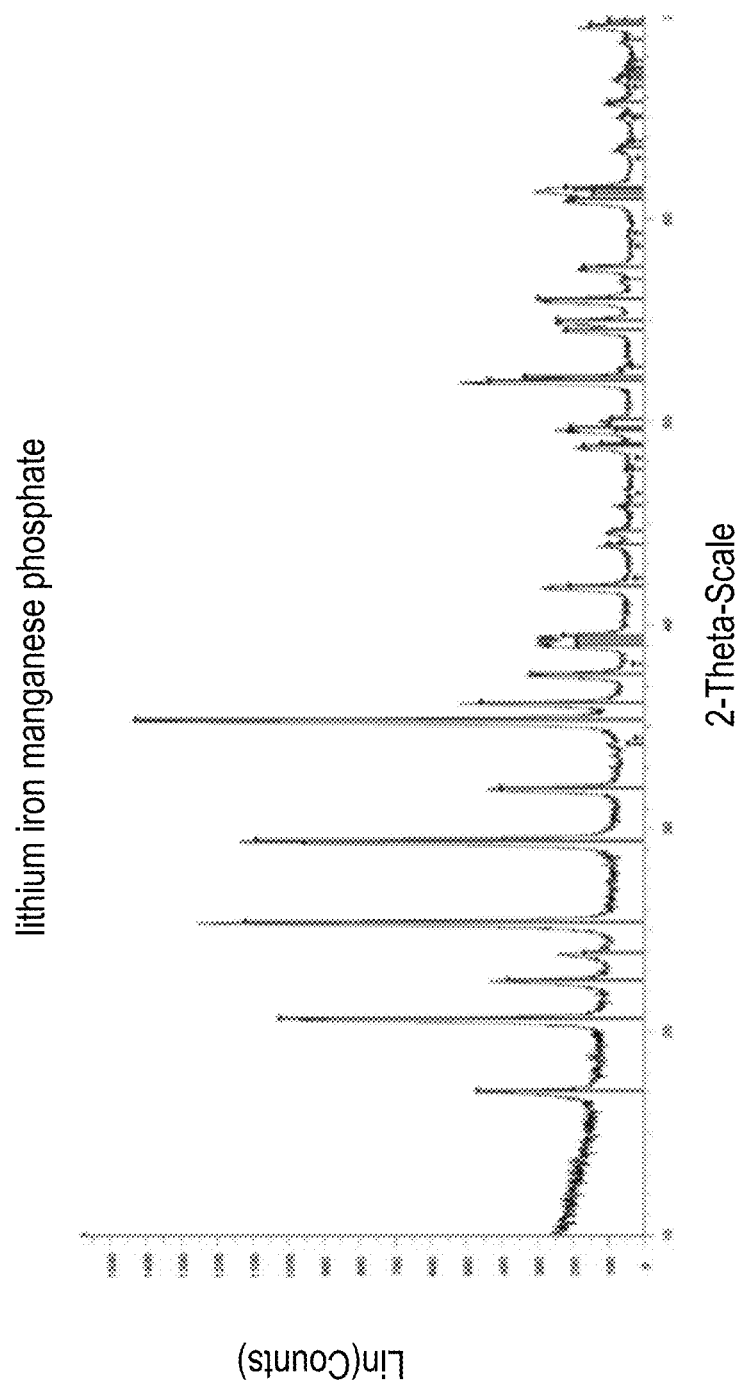
FIG. 10A schematically illustrates the X-ray diffraction analysis diagram of another battery composite material prepared by the preparation method of the battery composite material of the present invention.
Figure 10B:
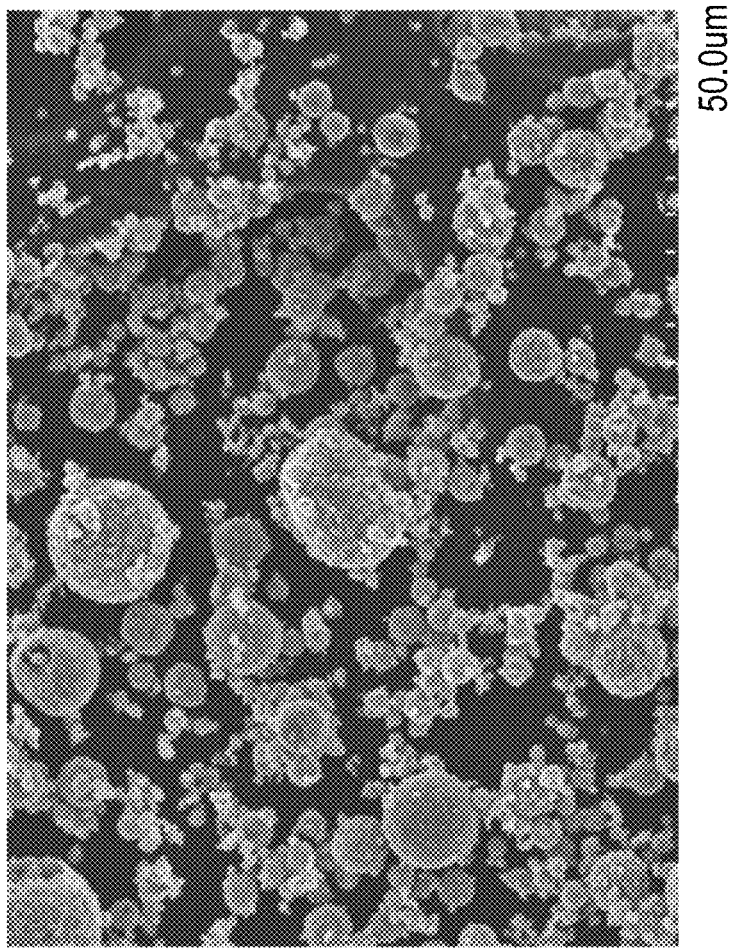
FIG. 10B schematically illustrates the SEM analysis diagram of another battery composite material prepared by the preparation method of the battery composite material of the present invention.

559.92 grams of the precursor, $Mn_5(HPO_4)_2(PO_4)_2(H_2O)_4$, obtained in the above-mentioned embodiments, 226.23 grams of heptairon hexaphosphate ($Fe_7(PO_4)_6$), 184.7 grams of lithium carbonate ($Li_2CO_3$), and 2 liters of deionized water are provided to process a reaction. Next, after dispersing and grinding, carbon source is added to obtain precursor solution. Then, the precursor solution is dried by the spray drying method, and sintered to phase at 600° C. for 5 hours to produce the battery composite material. The battery composite material is analyzed in manner of X-ray diffraction, and the analysis diagram is shown as FIG. 10A. After comparing the diagram with JCPDS card, the compound is confirmed to be lithium iron manganese phosphate ($LiMn_{0.7}Fe_{0.3}PO_4$). The surface exterior is analyzed through SEM, and the SEM analysis diagram is shown as FIG. 10B.

Embodiment 11

Figure 11A:
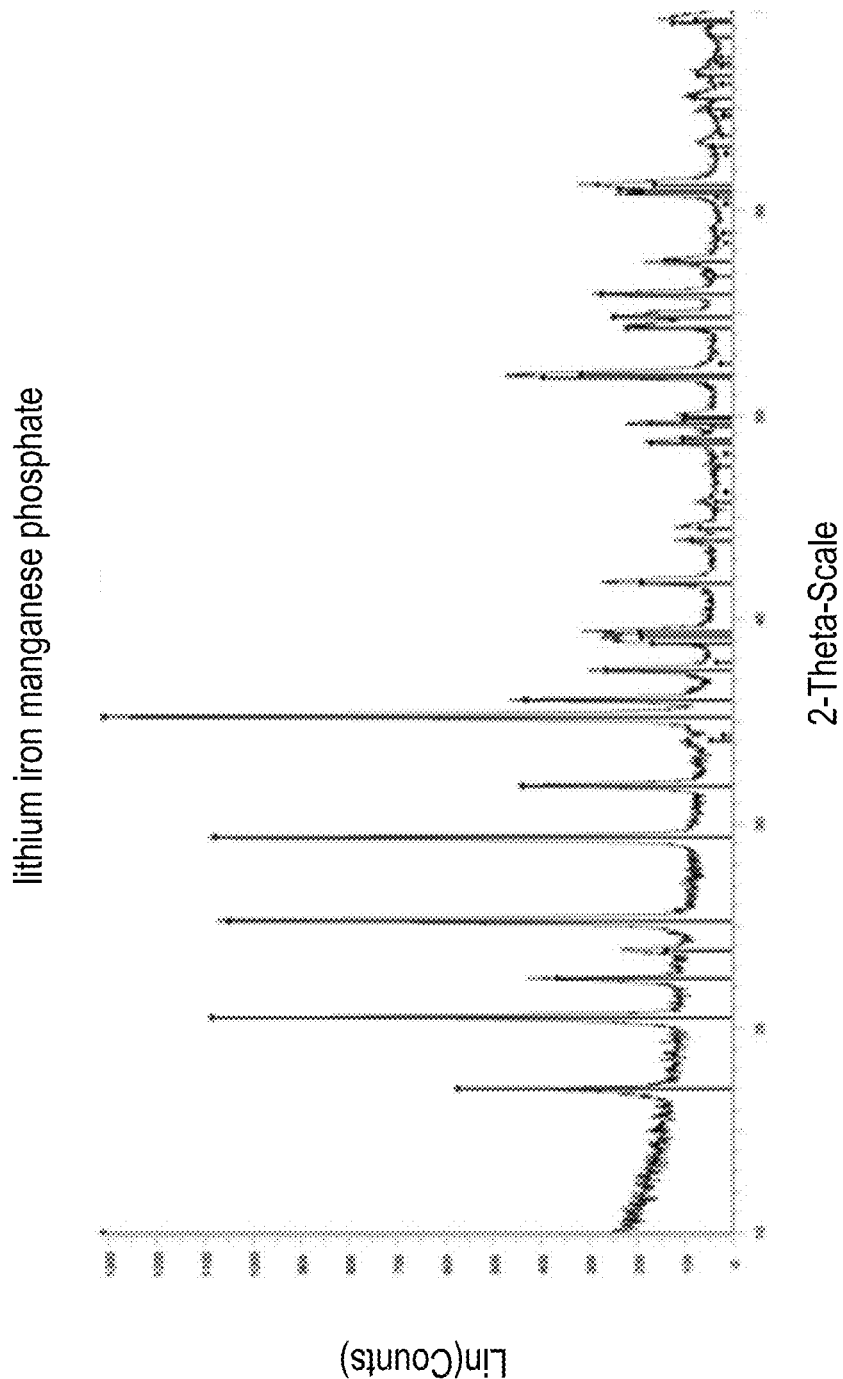
FIG. 11A schematically illustrates the X-ray diffraction analysis diagram of another battery composite material prepared by the preparation method of the battery composite material of the present invention.
Figure 11B:
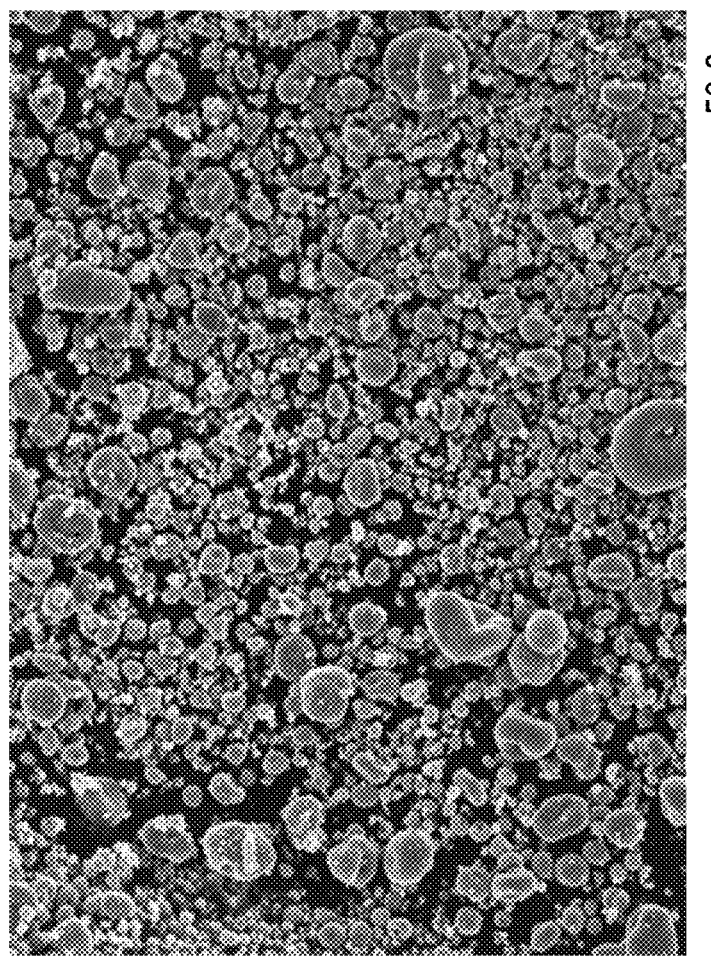
FIG. 11B schematically illustrates the SEM analysis diagram of another battery composite material prepared by the preparation method of the battery composite material of the present invention.

559.92 grams of the precursor, $Mn_5(HPO_4)_2(PO_4)_2(H_2O)_4$, obtained in the above-mentioned embodiments, 226.23 grams of iron(III) phosphate dihydrate ($FePO_4 \cdot 2H_2O$), 184.7 grams of lithium carbonate ($Li_2CO_3$), and 2 liters of deionized water are provided to process a reaction. Next, after dispersing and grinding, carbon source is added to obtain precursor solution. Then, the precursor solution is dried by the spray drying method, and sintered to phase at 600° C. for 5 hours to produce the battery composite material. The battery composite material is analyzed in manner of X-ray diffraction, and the analysis diagram is shown as FIG. 11A. After comparing the diagram with JCPDS card, the compound is confirmed to be lithium iron manganese phosphate ($LiMn_{0.7}Fe_{0.3}PO_4$). The surface exterior is analyzed through SEM, and the SEM analysis diagram is shown as FIG. 11B.

Embodiment 12

Figure 12:
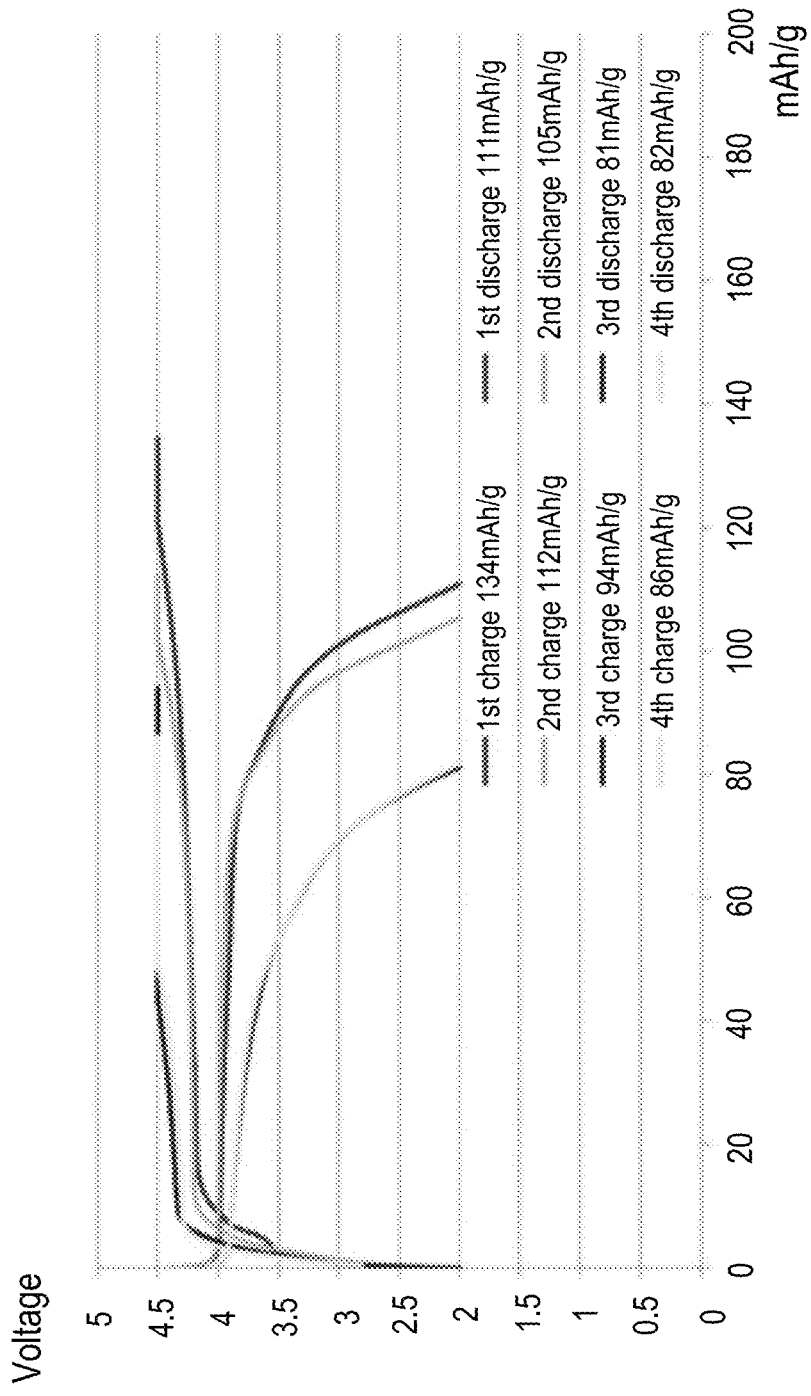
FIG. 12 schematically illustrates a charging and discharging characteristic diagram of a cell battery made of the battery composite material prepared by the preparation method of the battery composite material of the present invention.

The lithium manganese phosphate ($LiMnPO_4$) obtained in the above-mentioned embodiments is mixed with carbon black (Super P) and binder (NVDF+NMP) as the proportion of 8.5:0.5:1, and the weight percentage concentration of the binder is 4%. For example, firstly, 0.5 grams of carbon black (Super P) and 25 grams of binder (NVDF:NMP=40:960) are mixed at 1200 rpm for 10 minutes. Then, 8.5 grams of lithium manganese phosphate ($LiMnPO_4$) is added and mixed for another 10 minutes. Next, the dispersed slurry is coated with thickness of 0.3 mm on an aluminum substrate by a blade coater, and the coated pole piece is put into the oven, dried at 110° C. for 1 hour and then taken out. Then, a round pole plate is made with lithium as the negative electrode, and a diameter of the round pole plate is 1.3 cm. Then, lithium hexafluorophosphate ($LiPF_6$) with molarity as 1M, EC and EMC are mixed as electrolyte, among which the volume ratio of EC and EMC is 3:7. Lastly, the coated pole piece, the round pole plate and the electrolyte are made into a coin-cell battery. The electric characteristics of charging and discharging are tested and analyzed through a charging and discharging machine. The test and the analysis are performed at 0.1 coulombs for two cycles and 2 coulombs for two cycles. The charging and discharging characteristic diagram is shown as FIG. 12. The cutoff voltage of the coin-cell battery is 2 to 4.5 volts.

Embodiment 13

Figure 13:
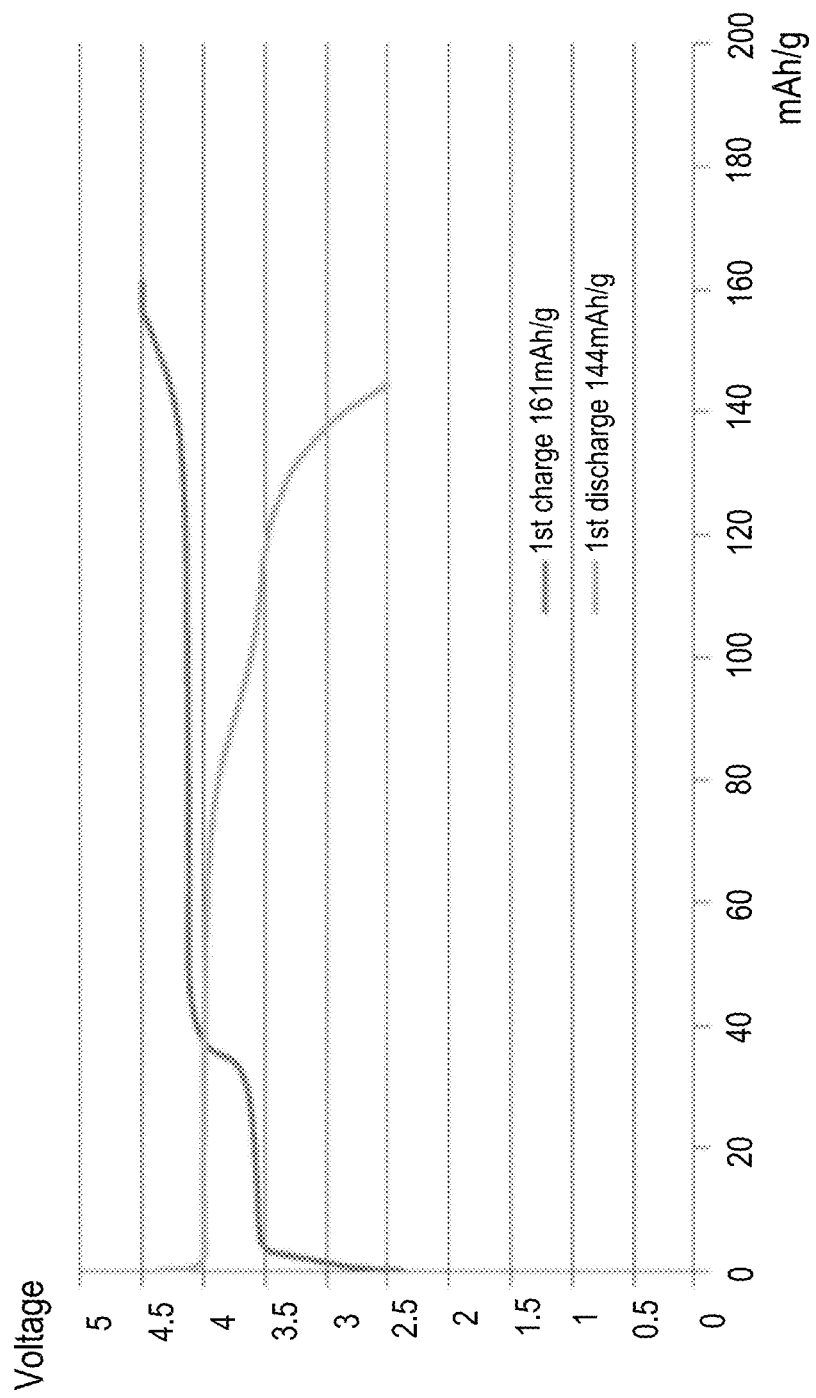
FIG. 13 schematically illustrates a charging and discharging characteristic diagram of another cell battery made of the battery composite material prepared by the preparation method of the battery composite material of the present invention.

The lithium iron manganese phosphate ($LiMn_xFe_{1-x}PO_4$) obtained in the above-mentioned embodiments is mixed with carbon black (Super P) and binder (NVDF+NMP) as the proportion of 8.5:0.5:1, and the weight percentage concentration of the binder is 4%. For example, firstly, 0.5 grams of carbon black (Super P) and 25 grams of binder (NVDF:NMP=40:960) are mixed at 1200 rpm for 10 minutes. Then, 8.5 grams of lithium iron manganese phosphate ($LiMn_xFe_{1-x}PO_4$) is added and mixed for another 10 minutes. Next, the dispersed slurry is coated with thickness of 0.3 mm on an aluminum substrate by a blade coater, and the coated pole piece is put into the oven, dried at 110° C. for 1 hour and then taken out. Then, a round pole plate is made with lithium as the negative electrode, and a diameter of the round pole plate is 1.3 cm. Then, lithium hexafluorophosphate (LiPF6) with molarity as 1M, EC and EMC are mixed as electrolyte, among which the volume ratio of EC and EMC is 3:7. Lastly, the coated pole piece, the round pole plate and the electrolyte are made into a coin-cell battery. The electric characteristics of charging and discharging are tested and analyzed through a charging and discharging machine. The test and the analysis are performed at 0.1 coulombs for two cycles and 2 coulombs for two cycles. The charging and discharging characteristic diagram is shown as FIG. 13. The cutoff voltage of the coin-cell battery is 2 to 4.5 volts.

From the above description, the present invention provides a preparation method of battery composite material and a precursor thereof. Through simple aqueous solution method, the precursor is produced by reacting in acidic environment to prepare the battery composite material. The steps of the preparation method are less complicated, such that the preparation time is reduced, and the preparation effectiveness is enhanced. Meanwhile, by producing the precursor at low temperature within a short time period in the process of a low-temperature phase method, the energy consumption is reduced, the phase of the precursor is more stable, and the advantages of reducing the cost of preparation and enhancing the quality of products are achieved.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A preparation method of a battery composite material, at least comprising steps of:
    (a) providing a manganese-contained compound, phosphoric acid, a lithium-contained compound, a carbon source, and deionized water, wherein a chemical formula of the phosphoric acid is written by $H_3PO_4$;
    (b) processing a reaction of the manganese-contained compound, the phosphoric acid, and a portion of the deionized water to produce a first product;
    (c) placing the first product at a first temperature for at least a first time period to produce a first precursor, wherein a chemical formula of the first precursor is written by $Mn_5(HPO_4)_2(PO_4)_2(H_2O)_4$; and
    (d) processing a reaction of at least the first precursor, the lithium-contained compound, and another portion of the deionized water, adding the carbon source, and then calcining to produce the battery composite material.

2. The preparation method according to claim 1, wherein the manganese-contained compound is manganese carbonate, manganese nitrate or manganese sulfate, and the lithium-contained compound is lithium carbonate, lithium hydroxide or lithium acetate.

3. The preparation method according to claim 1, wherein a chemical formula of the battery composite material is written by $LiMnPO_4$.

4. The preparation method according to claim 1, wherein the step (d) is processing a reaction of the first precursor, an iron-contained compound, the lithium-contained compound, and another portion of the deionized water, adding the carbon source, and then calcining to produce the battery composite material, wherein a chemical formula of the battery composite material is written by $LiMn_xFe_{1-x}PO_4$, and wherein x is larger than 0.5 and less than or equal to 1.

5. The preparation method according to claim 4, wherein the iron-contained compound is heptairon hexaphosphate, a chemical formula of which is written by $Fe_7(PO_4)_6$, or the iron-contained compound is iron(III) phosphate dehydrate, a chemical formula of which is written by $FePO_4 \cdot 2H_2O$.

6. The preparation method according to claim 1, wherein the step (b) further comprises a step (b1): performing a grinding and dispersing action and a drying action to the first product.

7. The preparation method according to claim 6, wherein the grinding and dispersing action is implemented by a ball mill.

8. The preparation method according to claim 6, wherein the drying action is implemented by rolling dehydration or spray drying.

9. The preparation method according to claim 1, wherein the step (d) further comprises steps of:
- (d1) processing a reaction of the first precursor, the lithium-contained compound, and a portion of the deionized water, and adding a dispersant;
- (d2) performing a grinding action, and adding the carbon source to obtain a first precursor solution; and
- (d3) performing a spray drying action and a thermal treatment to the first precursor solution to produce the battery composite material.

10. The preparation method according to claim 9, wherein the thermal treatment is performed at a temperature larger than 600° C. for at least 5 hours.

11. The preparation method according to claim 1, wherein the first temperature is larger than or equal to 60° C., and less than or equal to 100° C.

12. The preparation method according to claim 1, wherein the first time period is larger than or equal to 18 hours.

13. A preparation method of a battery composite material, at least comprising steps of:
- (a) providing a manganese-contained compound, an iron-contained compound, phosphoric acid, a lithium-contained compound, a carbon source, and deionized water, wherein a chemical formula of the phosphoric acid is written by $H_3PO_4$;
- (b) processing a reaction of the manganese-contained compound, the iron-contained compound, the phosphoric acid, and a portion of the deionized water to produce a second product;
- (c) placing the second product at a first temperature for at least a first time period to produce a second precursor, wherein a chemical formula of the second precursor is written by $(Mn_x,Fe_{1-x})_5(HPO_4)_2(PO_4)_2(H_2O)_4$, and wherein x is larger than 0.5 and less than or equal to 1; and
- (d) processing a reaction of at least the second precursor, the lithium-contained compound, and another portion of the deionized water, adding the carbon source, and then calcining to produce the battery composite material, wherein a chemical formula of the battery composite material is written by $LiMn_xFe_{1-x}PO_4$.

* * * * *